United States Patent [19]
Norman

[11] 3,833,096
[45] Sept. 3, 1974

[54] MECHANICAL BRAKE FOR TAP CHANGERS

[75] Inventor: Sivert Norman, Ludvika, Sweden

[73] Assignee: Allmanna Svenska Elektriska Aktiebolaget, Vasteras, Sweden

[22] Filed: Aug. 20, 1973

[21] Appl. No.: 389,564

Related U.S. Application Data
[63] Continuation of Ser. No. 220,154, Jan. 24, 1972, abandoned.

[30] Foreign Application Priority Data
Feb. 11, 1971 Sweden.............................. 1713/71

[52] U.S. Cl................. 188/85, 188/72.7, 188/166, 192/33 R
[51] Int. Cl............................................. F16d 63/00
[58] Field of Search .......... 188/72.6, 72.7, 72.1, 85, 188/166, 167; 192/33 R

[56] References Cited
UNITED STATES PATENTS

| 343,680 | 6/1886 | Tribe | 188/72.7 |
| 2,344,690 | 3/1944 | Freer | 188/72.7 |
| 3,078,734 | 2/1963 | Wiig | 188/85 |
| 3,228,493 | 1/1966 | Kersliner | 188/72.7 |
| 3,677,375 | 7/1972 | Wolf | 188/72.7 |

FOREIGN PATENTS OR APPLICATIONS

| 181,513 | 6/1922 | Great Britain | 188/85 |
| 1,360,202 | 3/1964 | France | 188/72.7 |
| 464,449 | 8/1928 | Germany | 188/166 |

*Primary Examiner*—George E. A. Halvosa
*Assistant Examiner*—Edward R. Kazenske

[57] ABSTRACT

A mechanical brake for the driving device of a tap changer includes a brake disc and cooperating brake shoes. A control disc driven simultaneously with the brake disc has two parts of different radius, the higher parts of which can engage against a roller journalled on a lever which is pivoted on the shaft which controls the contact device supplying current to the driving motor. The roller carrying lever also has pivoted to it a link connected to a control rod which passes between the brake shoes and has thinner and thicker parts. Rollers journalled on the brake shoes engage this rod, so that when it is moved in either direction from a median position by the rocking of the lever it pushes the brake shoes apart and releases the braking action.

1 Claim, 2 Drawing Figures

PATENTED SEP 3 1974　　　　　　　　　　　　　3,833,096

MECHANICAL BRAKE FOR TAP CHANGERS

This is a continuation of application Ser. No. 220,154, filed Jan. 24, 1972 now abandoned.

BACKGROUND OF THE INVENTION

1. Field of the Invention

The invention relates to a mechanical brake for the driving device of a tap changer.

2. The Prior Art

Tap changers for transformers are usually provided with a brake which stops the rotation of the driving motor when the tap changer has completed a switching operation. The brake normally consists of a magnetic brake which is closed when the drive motor is currentless. If the tap changer is to be operated manually in the currentless state, the operation must be carried out with the brake on throughout, which causes unnecessary work and wear on the brake, or the tap changer must be provided with a device which disconnects the motor upon manual operation.

SUMMARY OF THE INVENTION

A device according to the present invention eliminates the drawbacks mentioned. The invention relates to a mechanical brake for the driving device of a tap changer, comprising a brake disc driven by the driving motor of the tap changer and brake shoes cooperating therewith.

The mechanical brake includes a brake disc and co-operating brake shoes. A control disc driven simultaneously with the brake disc has at least two parts of different radius, the higher parts of which can engage against a roller journalled on a lever which is pivoted on the shaft which controls the contact device supplying current to the driving motor. The roller carrying lever also has pivoted to it a link connected to a control rod which passes between the brake shoes and has thinner and thicker parts. Rollers journalled on the brake shoes engage this rod, so that when it is moved in either direction from a median position by the rocking of the lever it pushes the brake shoes apart and releases the braking action.

BRIEF DESCRIPTION OF THE DRAWINGS

The invention will now be described with the help of the drawings in which.

DESCRIPTION OF THE PREFERRED EMBODIMENTS

Figure 1:
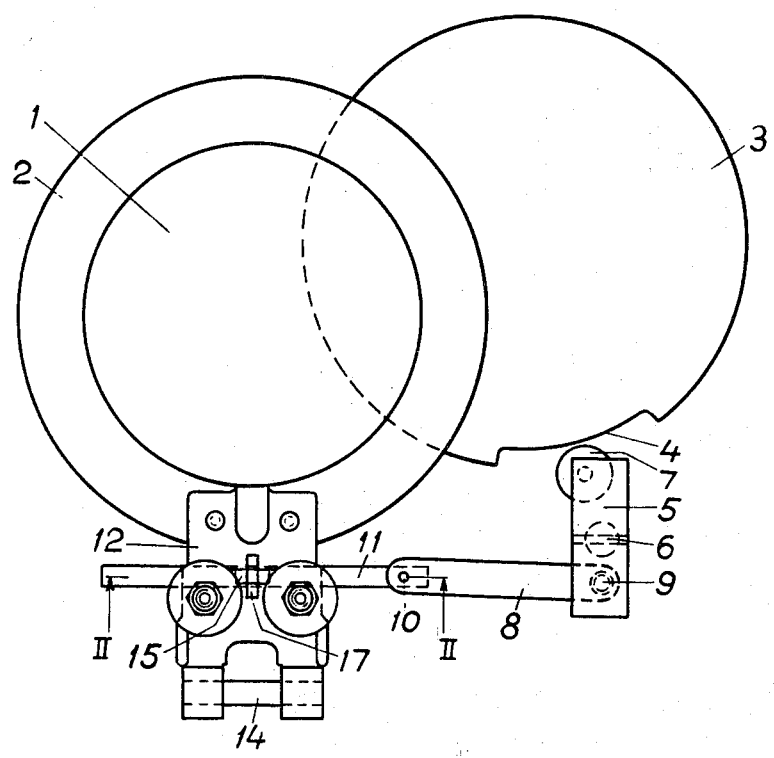
FIG. 1 shows a view of the brake.

A brake disc 1 having an annular braking surface 2 is connected to the driving motor and driven by this. The brake disc drives a control disc 3, for example by means of a toothed gear. The control disc preferably rotates more slowly than the brake disc. The ratio between the speeds of the brake and control discs may be 5:1, for example. In the embodiment shown and described here the periphery of the control disc is provided with a section 4 having less radial height than the rest of the disc. Other possibilities are to provide the control disc with two or more depressed parts similar to the part 4, or with raised collars.

A control arm 5 is attached to a turnable shaft 6. The control arm carries a control roller 7 which is in abutment with the periphery of the control disc. In the rest position of the tap changer, the roller is in the lowered part 4. On the other side of the shaft 6 a coupling rod 8 is journalled on a pin 9 in the control arm 5. The other end of the coupling rod is connected by a joint 10 to an operating rod 11.

The brake disc 1 cooperates in known manner with two brake shoes 12 and 13 which are journalled on a shaft 14 and arranged in relation to each other so that they are normally in abutment with the brake surface 2. Each brake shoe is provided with a roller 15, 16, respectively, which are journalled for rotation about shafts 17, 18, respectively, which are parallel to the plane of the brake disc. The operating rod 11, mentioned above, is inserted between the two rollers 15 and 16. The brake shoes are pressed towards each other by springs (not shown).

Figure 2:
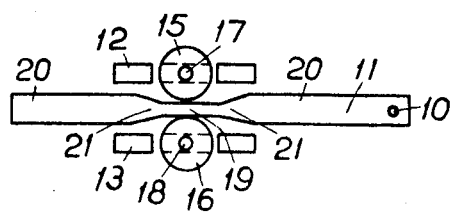
FIG. 2 shows the appearance of the operating rod and its position between the brake shoes.

As is clear from FIG. 2, the operating rod 11 has a narrow section 19 which in the rest position of the tap changer is between the two rollers. The thickness of this section is selected so that the rollers are only just in contact with the part 19 of operating rod. The brake shoes are therefore not influenced by the operating rod, but abut against the brake disc and hold it firmly. On each side of the narrow section 19 the operating rod is provided with a wider section 20 and a wedge-shaped transition part 21 between the narrow and the wide sections.

When the operating rod is displaced to one side, either to the left or to the right in FIG. 2, the rollers 15 and 16 will pass over one of the wedge-shaped sections 21 and up to the wide section 20. The brake shoes are thus forced apart and the braking action ceases. When the tap changer moves in one direction the control disc rotates clockwise and the control arm 5 is therefore turned counter-clockwise as soon as the control roller 7 moves out of the lowered section 4 and on to the raised part of the control disc. The operating rod 11 is thus pulled to the right and the rollers 15 and 16 roll up on to the wider part of the operating rod so that the brake is released. If the tap changer is moved in the other direction, the control arm also moves the other way and the operating rod 11 is pulled to the left, but the result will be the same for the brake. While the brake construction means that the driving motor must start its operation with the brake on, nevertheless, since the proper switching operation of the tap changer at that time has not yet started, in practice it does not matter. The driving motor is perfectly capable of overcoming the brake power. The big advantage of the invention is that, when the tap changer is being operated manually, the brake is off during almost the entire switching operation in the currentless state.

The shaft 6 which carries the control arm 5 controls the contact device which provides the driving motor with current. When the roller 7 falls into the recess 4, the shaft 6 is turned and the current to the driving motor is broken at the same moment that the brake operates.

I claim:

1. Mechanical brake for the driving device of a tap changer, comprising a rotatable control disc and a brake mechanism;

said control disc having a periphery comprising at least two parts of different radial lengths;

said brake mechanism comprising a rotatable brake disc, a pair of brake shoes straddling said brake disc at one end thereof and being interconnected at the other end thereof for relative movement with respect to each other, and an operating rod;

each brake shoe of said pair having a roller mounted thereon between the said ends of said brake shoe;

one end of said operating rod positioned between and abutting said rollers for longitudinal movement substantially tangentially with respect to said brake disc;

said one end of said operating rod having a first section of a predetermined width, and second and third sections on opposite sides of said first section having a width greater than the width of said first section;

said operating rod is in a first position when said first section is between said rollers enabling said braking shoes to contact said braking disc and in a second position when said second or third sections are between said rollers separating said braking shoes away from and out of contact with said brake disc;

said operating rod having an end opposite said one end and said opposite end of said operating rod being connected to one end of a control arm;

said control arm being pivotable and having a control roller journalled thereon and in abutment with said periphery of said control disc, whereby as said control roller moves over the different radial lengths of said periphery said control arm pivots and thereby longitudinally moves said operating rod between said first and second positions; and a means for driving said control disc and brake disc in unison.

* * * * *